No. 826,070. PATENTED JULY 17, 1906.
E. SUTHERLAND.
WEIGHING SCALE.
APPLICATION FILED OCT. 14, 1905.
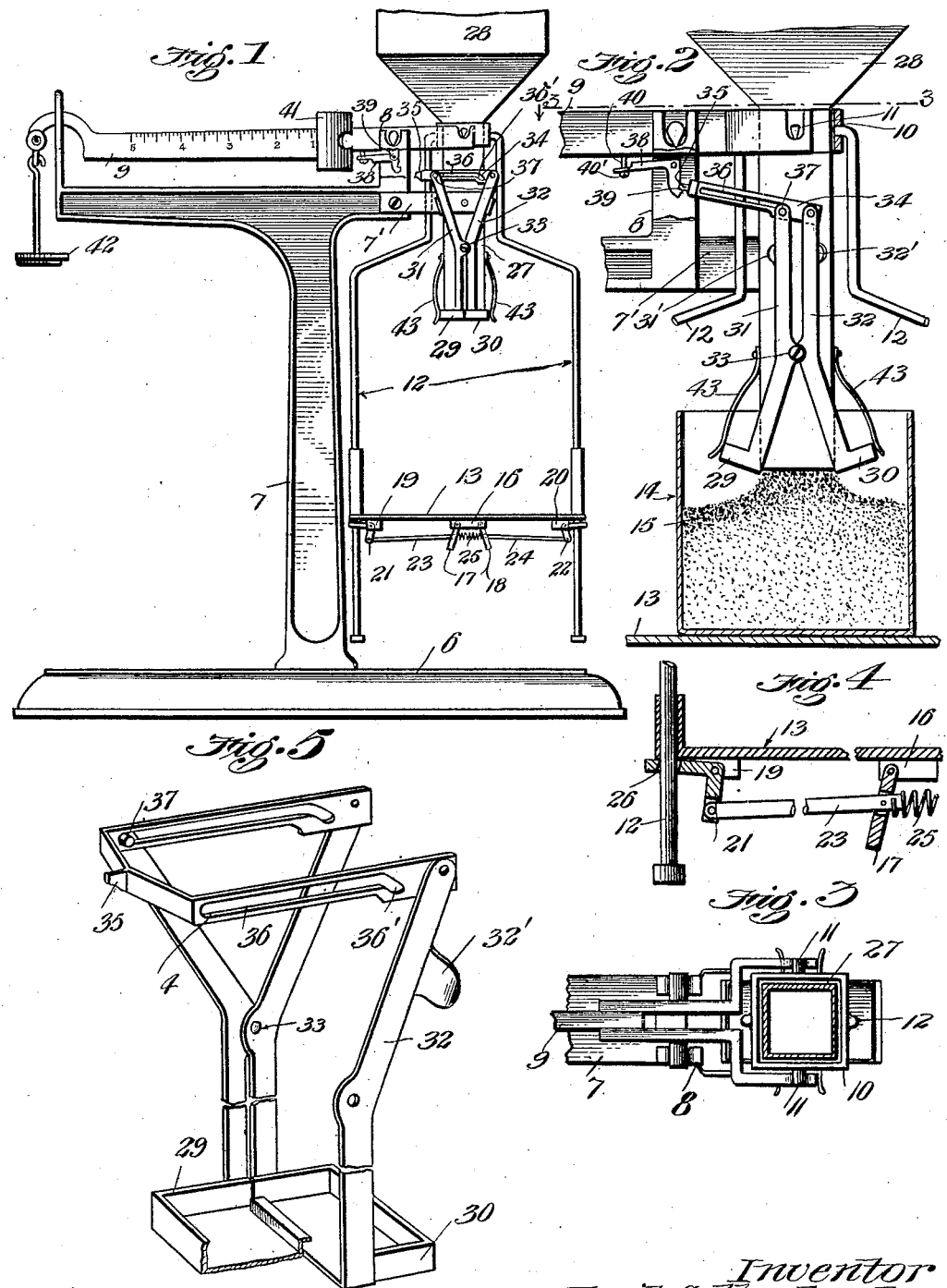
Witnesses
Inventor
Emil Sutherland
by Hazard & Markham
Attorneys.

UNITED STATES PATENT OFFICE.

EMIL SUTHERLAND, OF HOLLYWOOD, CALIFORNIA.

WEIGHING-SCALE.

No. 826,070.  Specification of Letters Patent.  Patented July 17, 1906.

Application filed October 14, 1905. Serial No. 282,852.

*To all whom it may concern:*

Be it known that I, EMIL SUTHERLAND, a citizen of the United States, residing at Hollywood, in the county of Los Angeles, State of California, have invented new and useful Improvements in Weighing-Scales, of which the following is a specification.

My invention relates to a scale which will automatically cut off the supply of material being weighed whenever a predetermined weight of the same has passed the scale-gate; and the object thereof is to produce a scale of simple construction which will automatically cut off the supply of material as soon as a predetermined weight of the same rests on the scale-platform and in which the quantity of material intermediate the cut-off gate and the material bearing upon the scale-platform shall be reduced to the minimum. I accomplish these objects by the scale described herein and illustrated in the accompanying drawings, in which—

Figure 1 is a side elevation of my improved scale with some parts broken away for clearness of illustration. Fig. 2 is a side elevation of a portion of the parts shown in Fig. 1, showing the cut-off gates in their open position and a receptacle partly filled with material on the weighing-platform. Fig. 3 is a section on the line 3 3 of Fig. 2. Fig. 4 is a detail of one of the catches which hold the platform of the weighing device at any desired elevation on the arms thereof. Fig. 5 is a detail of the cut-off gates with parts broken away for clearness of illustration.

In the drawings, to the base 6 is secured the upright standard 7, which is provided with the upwardly-extending yoke 8, in which is mounted the scale-beam 9, the rear end of which is bifurcated, as best shown in Fig. 3. A square balance-frame 10, provided with trunnions 11, is mounted in the furcations of the scale-beam, the bearings therebetween, as well as the bearings between the yoke and the scale-beam, being knife-bearings of the ordinary scale type. This balance-frame carries depending rods 12, which are secured thereto at points equidistant from the bearing-points of the frame with the beam. Slidably mounted upon these rods is the platform 13, which supports a bag 14 or other receptacle in which the material 15, being weighed, is received. On the under side at the center of the platform are bearings 16, in which are pivotally-mounted levers 17 and 18. Adjacent to the rods on the under side of the platform are bearings 19 and 20, in which are mounted bell-crank levers 21 and 22, which are connected by rods 23 and 24 with levers 17 and 18, respectively, the connections being all pivotal connections. The ends of these rods preferably pass through the levers, as shown in Figs. 1 and 4, and provide means for securing between levers 17 and 18 a spiral spring 25, which keeps the levers in position to cause the bell-crank levers to grip rods 12. These rods pass through the ends of the levers through apertures, one of which, 26, is shown in Fig. 4, to prevent the platform from slipping downwardly on said rods. When it is desired to change the position of said platform on said rods, the operator with his thumb and finger brings the outer ends of levers 17 and 18 together, thereby releasing the grip of the bell-crank levers upon the rods, and he then moves the platform up or down, as desired, to accommodate it for the reception of a higher or lower receptacle for containing the material to be weighed.

To the standard 7 is secured an arm 7', to which is secured a delivery-chute 27, which chute projects downwardly a sufficient distance between rods 12 for the proper reception of the material-holding bag, which receives the material to be weighed. This chute passes upwardly through the balance-frame 10, and on the top thereof is provided a hopper 28, in which a quantity of material to be weighed may be placed. The bottom of this chute is controlled by gates 29 and 30, which are provided with upwardly-extending arms 31 and 32, which arms are pivotally connected to the chute at opposite sides thereof, one of the pivots 33 being shown in Figs. 1 and 2. To the upper ends of the arms 32 of the gate 30 is pivotally secured a trigger 34, which is preferably U-shaped and provided with a bill 35. In each side of the trigger is a longitudinal slot 36, which curves near the end and terminates in an offset 36' near the union between the trigger and arms. Arms 31 of gate 29 are provided with pins 37, which pass into slot 36 of the trigger. An L-shaped catch 38 is pivotally mounted by pin 39, secured in yoke 8. In the lower member of this catch is a notch 39', which receives and holds therein the bill of the trigger, as shown in Fig. 2, when the gates are opened to permit the passage of material through the chute. A stud 40 passes through the other member of the catch and is provided with a head 40', which engages the catch and pulls the other member out of engagement with the bill of the trigger when the scale-beam rises, which it will do when the required amount of material is on the platform. Arms 31 and 32 at one side of the chute are provided with finger-pieces 31' and 32', which are gripped by the fingers and thumb of the operator to open the gates, which is done when the material is to be weighed.

In the operation of my scales the sliding poise 41 or weight 42, or both, are placed in position to indicate the required weight of material desired. The receptacle for such material is placed upon the platform and the platform is adjusted upon its supporting-rods, so that the mouth of the receptacle is just a trifle above the bottom of the chute. The operator then opens the gates by bringing the upper ends of arms 31 and 32 close together, thereby causing the pin in arm 31 to travel in the slots in the trigger and to enter the offset 36' thereof. This movement of pin 37 in slot 36 raises the trigger, so that the bill thereof catches into the notch 39' of the catch 38, thereby preventing the outer end of the trigger from moving downwardly. As soon as the required weight of material has entered the receptacle the outer end of the tare-beam rises, and stud 40 causes the disengagements of the catch on the trigger, whereupon the springs 43, which are secured to the chute and bear against the gates, cause the gates to close, and the further movement of the material into the receptacle ceases, and the receptacle may be removed from the platform as it contains the required amount of material, proper allowance being made for the time required to close the gates.

Having described my invention, what I claim as new, and desire to secure by Letters Patent, is—

1. The combination with a weighing mechanism of a hopper provided with a delivery-chute arranged over the weighing-platform of the weighing mechanism; a pair of gates provided with arms pivotally secured to the sides of said chute intermediate the gates and their outer ends; a trigger having an L-shaped slot therein pivotally secured to the arms of said outer gate; a pin secured to the arms of the inner gate, said pin projecting into the slot in the said trigger; a catch operatively secured to the scale-beam of the weighing mechanism for engaging the trigger to hold the gates open and to release the trigger when said beam rises; and springs secured to said chute and bearing against said gates to close the same when the trigger is released.

2. The combination with a weighing mechanism of a hopper provided with a delivery-chute arranged over the weighing-platform of the weighing mechanism; spring-pressed closures secured to said chute for closing the discharge-opening thereof; mechanism for holding said closure open when it is desired to discharge material through said chute; and mechanism for releasing said holding mechanism when a predetermined quantity of material has passed through the delivery-chute.

3. In an automatic weighing mechanism a delivery-chute arranged to discharge the material to be weighed upon the weighing-platform of said weighing mechanism; spring-pressed gates secured to said chute for closing the opening therethrough, said gates having upwardly-projecting arms; means secured to said arms for holding said gates open to permit the discharge of material through the delivery-chute, said means comprising a trigger pivoted to one of said arms and having a catch adapted to engage the other of said arms; and means for holding and releasing said trigger comprising a pivoted catch for holding the trigger while the gates are open and a stud secured to the scale-beam for engaging said catch and releasing the same from engagement with the trigger when the scale-beam rises.

In witness that I claim the foregoing I have hereunto subscribed my name this 14th day of September, 1905.

EMIL SUTHERLAND.

Witnesses:
  G. E. HARPHAM,
  EDMUND A. STRAUSE.